United States Patent
Limaye et al.

(10) Patent No.: US 7,464,378 B1
(45) Date of Patent: Dec. 9, 2008

(54) SYSTEM AND METHOD FOR ALLOWING MULTIPLE SUB-CLUSTERS TO SURVIVE A CLUSTER PARTITION

(75) Inventors: Prasad Limaye, Pune (IN); Neelakandan Panchaksharam, Pune (IN); Amol Katkar, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 913 days.

(21) Appl. No.: 10/727,425

(22) Filed: Dec. 4, 2003

(51) Int. Cl.
 *G06F 9/46* (2006.01)
 *G06F 11/00* (2006.01)
(52) U.S. Cl. ...................................... 718/100; 714/100
(58) Field of Classification Search ................. 718/100; 714/100
See application file for complete search history.

(56) References Cited

U.S. PATENT DOCUMENTS

| | | | |
|---|---|---|---|
| 6,587,938 B1 * | 7/2003 | Eilert et al. | 712/29 |
| 2002/0095470 A1 | 7/2002 | Cochran et al. | 709/208 |
| 2003/0159084 A1 | 8/2003 | Murphy et al. | 714/13 |
| 2003/0187927 A1 * | 10/2003 | Winchell | 709/204 |

* cited by examiner

*Primary Examiner*—Meng-Ai An
*Assistant Examiner*—Mengyao Zhe
(74) *Attorney, Agent, or Firm*—Campbell Stephenson LLP

(57) ABSTRACT

A method involves: executing an application on a cluster, which includes several nodes; and, subsequent to the cluster being partitioned into several sub-clusters, a first one of the sub-clusters executing a first one of the applications and a second one of the sub-clusters being capable of executing a second application. The first sub-cluster executes the first one of the applications after either determining that no other sub-cluster includes nodes that are part of the logical cluster that runs that application or after winning ownership of the logical cluster that runs the application. In a competition for ownership of a logical cluster, the winning sub-cluster is selected based on application-specific information, which is specific to the application that runs on that logical cluster.

22 Claims, 6 Drawing Sheets

SYSTEM AND METHOD FOR ALLOWING MULTIPLE SUB-CLUSTERS TO SURVIVE A CLUSTER PARTITION

FIELD OF THE INVENTION

This invention relates to computer systems and, more particularly, to clustered computer systems.

BACKGROUND

Clustering involves multiple computer systems, also referred to as nodes, cooperating with each other in order to provide increased availability and/or load balancing. A cluster is usually viewed as a single entity by clients that use the cluster's services. In a system that is designed to provide high availability, a cluster can continue providing a particular application service to clients even if one of the nodes included in that cluster fails. In other words, programs executing on the cluster can continue to function despite a problem with one node in the cluster.

Clusters usually include resources that are shared between several of the nodes. The most common shared resource in a cluster is some form of shared data resource, such as one or more storage devices. Using a shared data resource gives different nodes in the cluster access to the same data, a feature that is critical for most clustered applications. Although a storage device is perhaps the most common example of both a shared resource and a shared data resource, a variety of other types of shared devices (e.g., SAN (Storage Area Network) switches) will be well known to those having ordinary skill in the art.

Nodes within a cluster can be connected to each other by a network (e.g., a local area network (LAN) or wide area network (WAN) such as the Internet). Such a network can also facilitate communication between the cluster and its clients. The cluster nodes communicate with each other in order to coordinate their activities (e.g., to coordinate the migration of a service from one node to another during cluster maintenance, to coordinate updates to cluster membership information when nodes enter or leave the cluster, and the like). Nodes also communicate with each other in order to detect whether one of the nodes has failed. For example, nodes can exchange 'heartbeat' messages, which indicate that each node is currently available to the cluster and functioning properly. Often, this cluster-specific communication is implemented using a private network that links the cluster nodes (as opposed to using the same network that is also used to communicate with clients). If the failure of a node is detected (e.g., due to that node failing to send a heartbeat message within a given interval), the application services provided by that node may be relocated to another node.

If communication between cluster nodes is disrupted, a cluster can effectively be partitioned into two or more sub-clusters. Such a communication disruption can arise for a variety of reasons, including failure of a device within the communication network itself and an excessive processing load on one node interfering with that node's ability to send heartbeat messages. As a result of the communication disruption, a node can communicate with nodes in the same sub-cluster but cannot communicate with nodes in other sub-clusters. Accordingly, the node may erroneously determine that a node in another sub-cluster is no longer present in the cluster or functioning properly, and vice versa. If these two nodes provide the same service within the cluster, there is a possibility that both will assume that the other has failed, and that each node will consequently assume that it has exclusive access to a shared resource (e.g., a storage volume) used to provide that service. If both nodes modify the shared resource, a 'split-brain' situation may result. Such a split-brain situation arises when two nodes, each unaware of the other, both use a shared resource (e.g., both may be executing the same application and consequentially modifying data in a shared storage device) and cause data corruption or otherwise inconsistent cluster operation to occurs.

In order to prevent split-brain situations, cluster software is often configured to shut down all but one sub-cluster upon detection of a cluster partition. Such clustering software determines whether a node has failed or whether that node is simply not communicating properly. If the latter case exists, a cluster partition has occurred and all but one of the resulting sub-clusters are shut down in order to prevent them from being able to access shared resources. While these schemes prevent split-brain situations, it is desirable to have techniques that prevent split-brain situations while also maintaining better utilization of cluster nodes after detection of a cluster partition.

SUMMARY

Various embodiments of systems and methods are disclosed for handling a cluster partition by allowing nodes in all sub-clusters to continue providing cluster services if no logical cluster (e.g., a failover group for a particular application) spans more than one of the sub-clusters.

In one embodiment, a method involves: executing an application on a cluster, which includes several nodes; and, subsequent to the cluster being partitioned into several sub-clusters, a first one of the sub-clusters executing a first one of the applications and a second one of the sub-clusters being capable of executing a second application. Both the first and the second sub-cluster continue to operate as clusters, and each can perform various tasks associated with clusters (e.g., starting and stopping clustered applications and the like). The first sub-cluster executes the first one of the applications after either determining that no other sub-cluster includes nodes that are part of the logical cluster that runs that application or after winning ownership of the logical cluster that runs the application. For example, the method can involve the first one of the sub-clusters winning ownership of a logical cluster on which the first one of the applications is executed. Prior to the first one of the sub-clusters winning ownership of the logical cluster, more than one of the sub-clusters each included a node that participated in the logical cluster. Another sub-cluster, which participated in the logical cluster before the first sub-cluster won ownership of that logical cluster, can continue to execute a third application subsequent to the first one of the sub-clusters winning ownership of the logical cluster on which the first one of the applications is executed. In a competition for ownership of a logical cluster, the winning sub-cluster is selected based on application-specific information, which is specific to the application that runs on that logical cluster.

The foregoing is a summary and thus contains, by necessity, simplifications, generalizations and omissions of detail; consequently, those skilled in the art will appreciate that the summary is illustrative only and is not intended to be in any way limiting. The operations disclosed herein may be implemented in a number of ways, and such changes and modifications may be made without departing from this invention and its broader aspects. Other aspects of the present invention, as defined solely by the claims, will become apparent in the non-limiting detailed description set forth below.

BRIEF DESCRIPTION OF THE DRAWINGS

A more complete understanding of the present invention may be acquired by referring to the following description and the accompanying drawings, in which like reference numbers indicate like features.

Figure 1A:
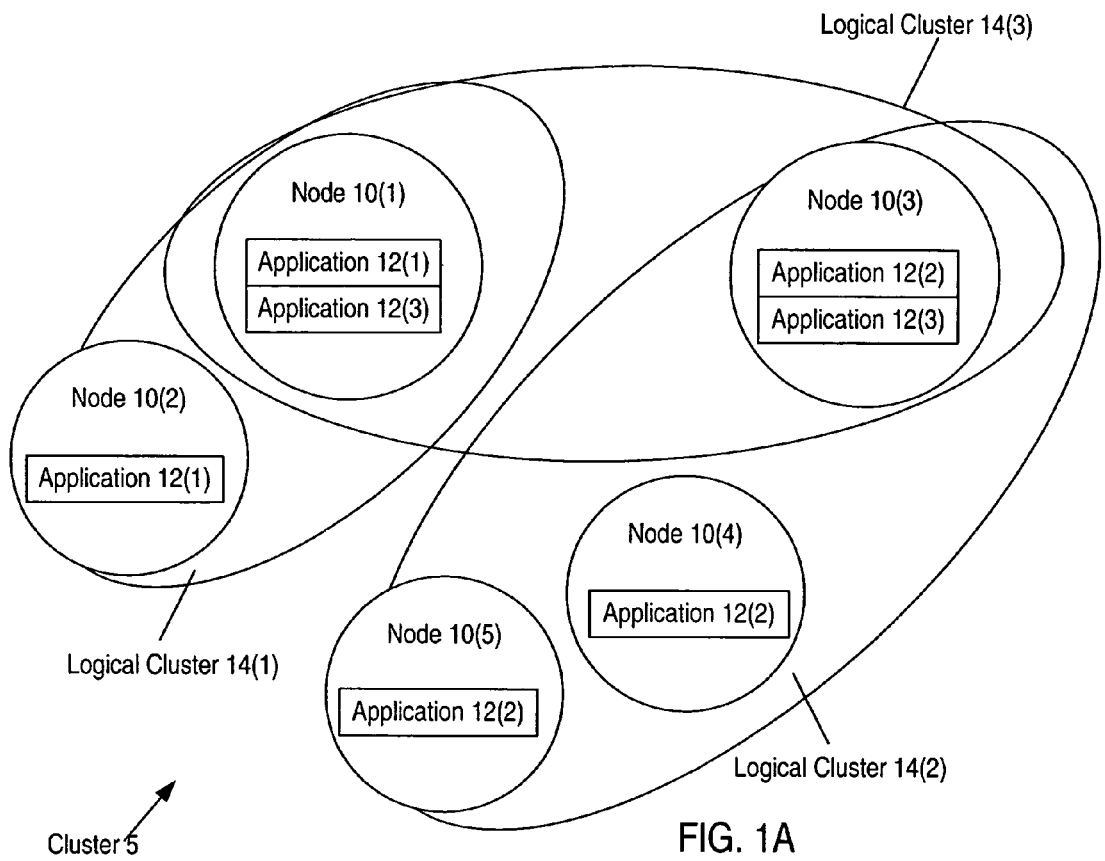
FIG. 1A shows a cluster that includes several nodes, each of which is configured to execute one or more applications, according to an embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Various services are provided by executing applications on a cluster. The cluster includes several logical clusters, each of which includes one or more nodes configured to provide a particular service by executing one of the applications. For example, a logical cluster can include a group of nodes configured as a failover group for a particular application. When communication between nodes in a cluster is disrupted, the cluster is partitioned into several sub-clusters. Each sub-cluster can continue to provide some of the cluster's services. If a logical cluster spans multiple sub-clusters, the sub-clusters compete for ownership of that logical cluster. The winning sub-cluster is determined, at least in part, by application-specific cluster configuration information for the particular application provided by the logical cluster. The losing sub-clusters can no longer participate in that particular logical cluster (i.e., no nodes in the losing sub-clusters can provide the service associated with the logical cluster); however, losing sub-clusters can continue to participate in other logical clusters. If multiple logical clusters each span multiple sub-clusters, the sub-clusters can have a separate competition for ownership of each logical cluster.

FIG. 1A shows a cluster that includes several nodes, each of which is configured to execute one or more clustered applications. As shown, cluster 5 includes five nodes 10(1)-10(5) (collectively, nodes 10). Each node can be or include a computing device, such as a personal computer, server, cell phone, or other device. In some embodiments, several nodes can be implemented in a single physical computing device. For example, a multiprocessor computer system may be subdivided into several virtual machines, each of which is used to implement a node in a cluster.

Nodes 10 are coupled to communicate with each other by one or more networks (not shown in FIG. 1A). For example, nodes 10 can be coupled by one or more LANs and/or WANs. Such networks can also couple cluster 5 to one or more external clients (it is noted that in some situations, nodes within cluster 5 can also be client of cluster 5). Additionally, nodes 10 can be coupled by one or more private networks. In some embodiments, private network(s) are used to communicate cluster-specific messages, such as heartbeat messages and messages effecting cluster membership and configuration updates, among the nodes.

Several applications 12(1)-12(3) are executed on cluster 5. Each node 10(1)-10(5) is configured to execute one or more of applications 12(1)-12(3) (collectively, applications 12). Applications 12 can include database management systems (DBMS), file servers, application servers, web servers, backup and restore software, customer relationship management software, and the like.

Node 10(1) is configured to execute applications 12(1) and 12(3). Node 10(2) is configured to execute application 12(1). Node 10(3) is configured to execute applications 12(2) and 12(3). Nodes 10(4) and 10(5) are each configured to execute application 12(2). It is noted that each node 10(1)-10(5) can also execute other non-clustered applications (not shown) in addition to executing one or more of clustered applications 12(1)-12(3).

Each application 12, in conjunction with various other hardware (e.g., network interface cards and storage devices) and software resources (e.g., file systems, databases, and other applications), provides an application service to a client of cluster 5. The application and the hardware and software used by that application when providing the application service are collectively referred to as a service group. For example, a service group for a Web application can include disk groups on which Web pages are stored, a volume built in the disk group, a file system using the volume, a database whose table spaces are files and whose rows contain page pointers, network interface cards to export the Web service, one or more IP addresses associated with the network cards, the application program, and associated code libraries. As another example, a service group that provides a database service can include database software, a network address (e.g., an IP (Internet Protocol) address), a file system, one or more logical storage volumes, and a set of physical storage devices. Some resources included in a given service group are duplicated on each node (e.g., all or part an application can be loaded into memory in each node) that executes a particular application. Other resources, such as storage volumes, are shared between nodes that are configured to execute the same application.

A given service group can be online or offline (or in an intermediate state while transitioning between online and offline or vice versa) on a particular node. For example, if nodes 10(1) and 10(3) are configured as a failover group (as opposed to a parallel group) for application 12(3), the service group associated with application 12(3) can be online on node 10(1) and offline on node 10(3). If node 10(1) fails, the service group for application 12(3) can be failed-over to node 10(3) by bringing that service group online on node 10(3).

Each node 10 executes clustering software that manages the service groups available at each node. The clustering software can test a service group to ensure that it is providing the expected service to clients. The clustering software can also automatically start and stop a service group. For example, clustering software on node 10(1) can stop the service group associated with application 12(3) before maintenance is performed on node 10(1). Clustering software on node 10(3) can detect that the service group is no longer online on node 10(1) and bring that service group online on node 10(3). If multiple service groups are present on a single node, then the clustering software monitors and manages each service group independently. For example, clustering software can migrate all of the resources in a service group to a new node without affecting other service groups on the new node.

The clustering software can also communicate messages with clustering software on other nodes. For example, the clustering software can send and receive heartbeat messages that indicate which nodes are present in the cluster and functioning properly.

A node is configured to execute a particular application if that node includes the application itself and either includes or has access to any resources included in the service group associated with that application. Nodes that are configured to execute the same application are each identified (e.g., in cluster configuration information for cluster 5) as being part of a logical cluster for that application. Each node that is selected to execute a particular application is considered to be a participant in the logical cluster that executes that particular application, regardless of whether the application is currently online on that particular node (e.g., a backup node in a failover group for the application is also a participant in the logical cluster executing the application).

As shown, nodes 10(1) and 10(2), which are both configured to run application 12(1), are included in logical cluster 14(1). Similarly, nodes 10(3), 10(4), and 10(5), which are each configured to run application 12(2), are included in logical cluster 14(2). Nodes 10(1) and 10(3), which are each configured to run application 12(3), are included in logical cluster 14(3). Each logical cluster can operate as a failover group or a parallel group (or some combination of these types of groups) with respect to a respective application.

In some embodiments, each logical cluster can be implemented as a failover group. Within a given failover group, the application provided by that failover group is online, partially online, or in any state other than offline (such as attempting to go online or attempting to go offline) on only one node at a time. For example, if logical cluster 14(1) is a failover group, application 12(1) can be online on node 10(1) and offline on node 10(2). Before node 10(2) can begin bringing application 12(1) online, node 10(2) must confirm that application 12(1) is offline on node 10(1). Within a given failover group, the node on which the failover group's application is currently online is referred to as the primary node. The other nodes, on which the application is currently offline, are referred to as backup nodes.

Figure 1B:
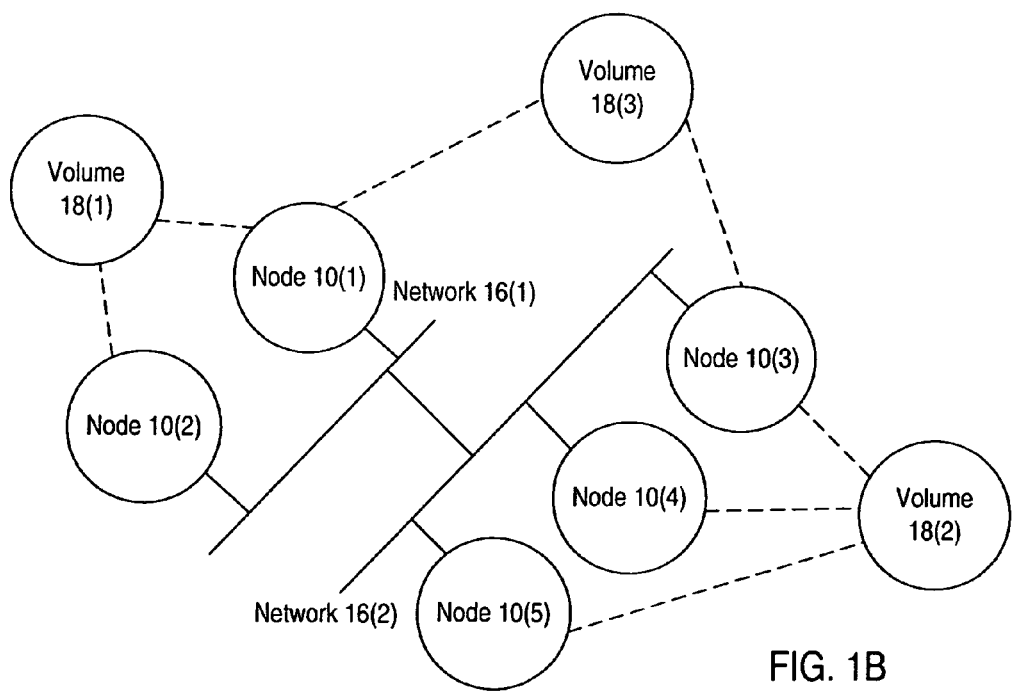
FIG. 1B shows how the different nodes in the cluster of FIG. 1A can be connected via several local area networks and how each node can have access to one or more storage volumes, according to one embodiment.

FIG. 1B shows how the different nodes in the cluster of FIG. 1A can be connected via several networks. As shown, nodes 10(1)-10(2) are coupled by network 16(1). Nodes 10(3)-10(5) are coupled by network 16(2). Networks 16(1) and 16(2) (collectively, networks 16) are coupled to each other (e.g., by one or more routers or other networking devices, not shown in FIG. 1B). Each network 16 can be implemented from a LAN, WAN, and/or private network. Clustering software on each node 10 communicates with clustering software on other nodes via networks 16. It is noted that nodes within a cluster can be coupled to communicate with each other in many other ways in addition to and/or instead of those shown in the specific example of FIG. 1B.

FIG. 1B also illustrates how each node can have access to one or more storage volumes 18(1)-18(3) (collectively, storage volumes 18). In this example, nodes 10(1) and 10(2) access storage volume 18(1). Nodes 10(3), 10(4), and 10(5) access storage volume 18(2). Nodes 10(1) and 10(3) access storage volume 18(3). Nodes 10 can access their respective storage volumes 18 via a local network (e.g., each storage volume can be implemented using NAS (Network Attached Storage)) or via a SAN (Storage Area Network). The communication channels between nodes 10 and storage volumes 18 can be independent of networks 16.

Each storage volume 18 can be implemented on one or more physical storage devices. A physical storage device can be a single device (e.g., a single hard drive, CD (Compact Disc) drive, or DVD (Digital Versatile Disc) drive). Alternatively, a storage device can include an array of such devices (e.g., a RAID array can include several hard drives controlled by a hardware array controller). Also, portions of more than one storage volume can be implemented on the same physical storage device.

Each storage volume 18 is configured to provide access to shared data for nodes hosting a respective application, so storage connectivity determines where applications are run. All nodes sharing access to a particular storage volume are eligible to run an application that stores its data to that storage volume. An application cannot be executed on or failed over to a node that does not have access to a particular storage volume on which that application stores its data. For example, application 12(1) stores its data on volume 18(1). Similarly, application 12(2) stores its data on volume 18(2). Application 12(3) stores its data on volume 18(3). As a result, application 12(3) can only run on nodes that have access to volume 18(3). Accordingly, only nodes 10(1) and 10(3) can be configured as part of logical cluster 14(3), which is a failover group for application 12(3) in this example. Similarly, application 12(1) can only run on nodes that have access to volume 18(1), and thus only nodes 10(1) and 10(2) can be configured as part of logical cluster 14(3). Application 12(2) can likewise only run on nodes having access to volume 18(2), and thus only nodes 10(3), 10(4), and 10(5) can be configured as part of logical cluster 14(2).

Figure 2:
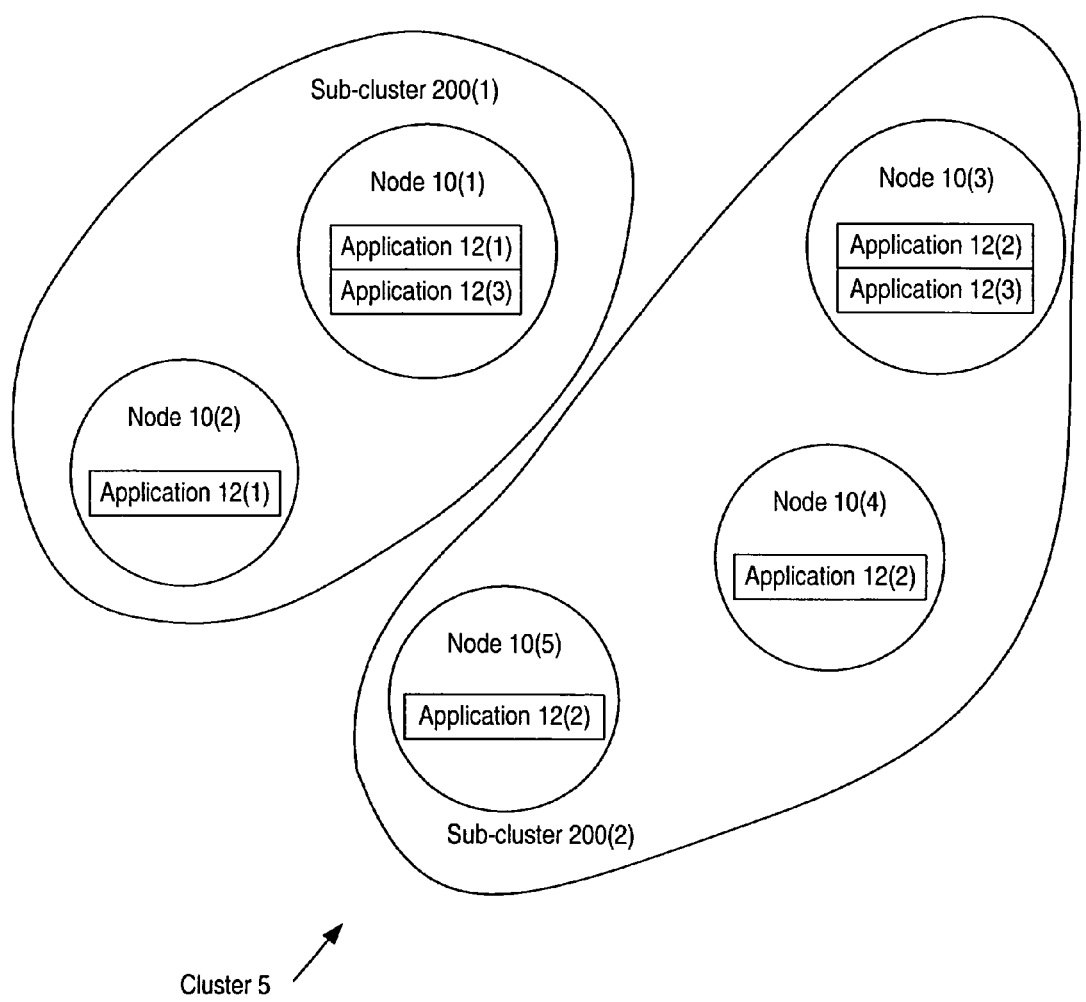
FIG. 2. shows how the cluster of FIG. 1A can be partitioned into two sub-clusters.

FIG. 2 shows how cluster 5 can be partitioned into two sub-clusters, sub-clusters 200(1) and 200(2) (collectively, sub-clusters 200). Here, nodes 10(1) and 10(2) are included in sub-cluster 200(1). Nodes 10(3), 10(4), and 10(5) are included in sub-cluster 200(2). This particular subdivision of cluster 5 can arise due to the failure of the connection between networks 16(1) and 16(2) (as shown in FIG. 1B). Each sub-cluster 200 is effectively a new cluster. However, these clusters are referred to as sub-clusters in order to identify the relationship between original cluster 5 and sub-clusters 200. It is noted that each sub-cluster 200 can itself be partitioned before the original partition is repaired. In such a situation, the sub-clusters in a partitioned sub-cluster 200 can behave in the same way as sub-clusters 200 behave in response to cluster 5 being partitioned, as described below.

Subsequent to the network partition, nodes in sub-cluster 200(1) cannot communicate directly with nodes in sub-cluster 200(2) and vice versa. However, the network partition may not disrupt each node's ability to access certain coordinator resources that are used when normal communication is disrupted. These coordinator resources are included in the cluster in order to avoid 'split-brain' situations in which data corruption or other inconsistencies arise due to different portions of the cluster no longer being able to communicate with each other. The coordinator resources provide a way for nodes to determine whether an apparent failure of a node is due to an actual failure or due to a cluster partition. Storage volumes 18 are examples of coordinator resources.

Looking at the example of FIG. 1B, nodes 10(1) and 10(3) may still be able access volume 18(3) after the failure of the link between networks 16(1) and 16(2). Whenever a backup node (e.g., node 10(3)) in logical cluster 14(3) detects that the primary node (e.g., node 10(1)) is no longer present in the cluster (which may be the result of a cluster communication failure instead of the failure of the primary node itself), the backup node accesses (or attempts to access) volume 18(3) before beginning to bring application 12(3) online. Based on the access or attempted access, the backup node can determine whether a cluster partition has occurred. For example, the primary node can write information to volume 18(3) indicating that the primary node is still functioning or maintain an exclusive lock on volume 18(3) in order to prevent any backup nodes from gaining access to the shared resource. If backup node detects either situation, the backup node determines that a cluster partition has occurred. It is noted that alternative coordinator resources can be provided in addition to and/or instead of storage volumes.

If a logical cluster does not span more than one sub-cluster, the service provided by that logical cluster continues to be provided by whichever sub-cluster now includes that logical cluster. For example, looking at the example of FIG. 2, all of nodes 10(3), 10(4), and 10(5), which make up logical cluster 14(2), are included in sub-cluster 200(2). Since none of the nodes in logical cluster 14(2) are included in a different sub-cluster, sub-cluster 200(2) can continue to provide the service provided by logical cluster 14(2). Similarly, since both nodes 10(1) and 10(2) configured as part of logical cluster 14(1) are included in sub-cluster 200(1), sub-cluster 200(1) can continue to provide the service provided by logical cluster 14(1). Thus, each sub-cluster 200(1) and 200(2) continues to provide one of the services originally provided by cluster 5. As this shows, subsequent to a cluster partition, multiple sub-clusters can each continue to operate as a cluster (e.g., by executing, starting, and stopping clustered applications).

Each sub-cluster 200 can determine whether a particular logical cluster potentially spans multiple sub-clusters by comparing its new cluster membership to cluster configuration information identifying the nodes that are part of the logical cluster executing that application (e.g., this function can be performed any time a node or group of nodes stops receiving heartbeat messages from another node or group of nodes). If each of the nodes in the logical cluster is included in the same sub-cluster, the sub-cluster automatically wins ownership of the logical cluster (e.g., without competing with another sub-cluster for ownership of the logical cluster) and can continue running the application. If at least one of the nodes identified in the cluster configuration information is not included in a sub-cluster's membership, the sub-cluster can determine whether the missing node(s) have failed or are no longer communicating due to a cluster partition.

When, subsequent to a cluster partition, a logical cluster spans sub-clusters (i.e., when more than one sub-cluster includes a node that is configured as part of that logical cluster), each sub-cluster spanned by the logical cluster competes to gain ownership of the logical cluster. The sub-cluster that wins the competition can continue (or begin) providing the service provided by the logical cluster. All losing sub-clusters will no longer be able to provide the service. Nodes in the losing sub-clusters that were previously configured as part of that logical cluster will be reconfigured so that they are no longer part of that logical cluster. This can involve bringing down nodes in the losing sub-clusters that were part of the logical cluster (e.g., by performing an orderly shut-down of the operating system and applications on each of those nodes, by powering off each of those nodes, or by causing each of those nodes to panic). Alternatively, these nodes can be reconfigured so that they will no longer run the application associated with the logical cluster and so that they will no longer have access to shared resources that were used by that application (e.g., so that these nodes cannot cause a split-brain situation by modifying a storage volume on which the application stores its data). For example, as shown in FIG. 2, logical cluster 14(3) spans sub-clusters 200(1) and 200(2). If sub-cluster 200(1) loses the competition for ownership of logical cluster 14(3), the service group for application 12(3) can be brought offline on node 10(1) (if not already offline) and node 10(1)'s access to storage volume 18(3) can be disabled. In such a situation, the nodes (e.g., node 10(1) and/or 10(2)) in the losing sub-cluster can continue to be part of other logical clusters and thus may continue to run other applications.

As an example of how sub-clusters can compete for ownership of a logical cluster, consider logical cluster 14(3) subsequent to the cluster partition shown in FIG. 2. Since node 10(1) is included in sub-cluster 200(1) and node 10(3) is included in sub-cluster 200(2), logical cluster 14(3) spans sub-clusters 200(1) and 200(2) subsequent to cluster 5 being partitioned. In this example, logical cluster 14(3) is configured as a failover group for application 12(3). When the cluster partition occurs, application 12(3) is online on node 10(1) and offline on node 10(3). After the cluster partition, node 10(3) will no longer detect node 10(1) via normal communication channels (e.g., heartbeat messaging between the two nodes may cease). Since node 10(3) is the backup node for logical cluster 14(3), node 10(3) will determine whether to bring application 14(3) online in response to not being able to detect node 10(1). Node 10(1) will also cease to be able to detect node 10(3). Both nodes 10(1) and 10(3) may access a coordinator resource to determine whether a cluster partition is responsible for their inability to detect each other.

Because logical cluster 14(3) spans multiple sub-clusters, sub-clusters 200(1) and 200(2) will compete to determine which sub-cluster will continue being able to run application 12(3). One or more nodes in each sub-cluster (e.g., node 10(1) in sub-cluster 200(1) and node 10(3) in sub-cluster 200(2)) access application-specific information, which is specific to application 12(3), when making this determination.

The application-specific information for application 12(3) is maintained at each node that executes application 12(3). This application-specific information can include cluster configuration information that is specific to application 12(3). For example, the cluster configuration information for application 12(3) can include information identifying each node 10(1) and 10(3) configured to run application 12(3). This information can also indicate the node on which application 12(3) is currently online. Cluster configuration information for application 12(3) can also include information indicating whether application 12(3) is dependent on any other applications. For example, in one embodiment, application 12(3) is a database application that depends on services provided by a database server, which is application 12(1), and that application 12(3) can only run in a cluster on which application 12(1) is also running. The application-specific information for application 12(3) can also include information that is not related to cluster configuration. For example, if application 12(3) is a database server, each node that executes application 12(3) can store application-specific information that identifies the number and/or rate of database server transactions performed on that node.

In some embodiments, priority in the competition for logical cluster ownership is given to a sub-cluster that includes the node on which application 12(3) is currently online. Priority can also (or alternatively) be given to a sub-cluster running an application on which application 12(3) is dependent. For example, sub-cluster 200(1) may be given priority to win the competition for ownership of logical cluster 14(3) if application 12(3) depends on application 12(1) being run on the same node or cluster as application 12(3). Another consideration when selecting which node wins the competition is how many nodes in each sub-cluster are configured to run application 12(3) (e.g., priority can be given to the sub-cluster that includes the greatest number of nodes configured to run application 12(3)).

Nodes 10(1) and 10(3) (and/or one or more other nodes in sub-clusters 200(1) and 200(2)) compete for their respective sub-clusters' ownership of logical cluster 14(3) by accessing the application-specific information for application 12(3) and then accessing (e.g., reading and/or writing to) or attempting to access (e.g., by attempting to gain a lock on) a coordinator resource associated with logical cluster 14(3). The coordinator resource can be included in the service group for application 12(3). For example, a region (e.g., a sector, byte, or block) or volume 18(3) can be reserved as a coordinator region for logical cluster 14(3). During a competition for ownership of logical cluster 14(3), a node in each sub-cluster can write to (or attempt to write to) a portion of this coordinator region. Ownership of logical cluster 14(3) can then be determined from the value or values written to the coordinator region, or based on which node's attempt to access the coordinator region succeeded. For example, if one node gains an exclusive lock on the coordinator region, that node's sub-cluster wins ownership of the relevant logical cluster.

In some embodiments, a quorum or majority algorithm can be used to determine which sub-cluster wins ownership of the logical cluster. For example, if a node in each sub-cluster writes a value (e.g., identifying whether that sub-cluster currently has the application online, how many nodes within that sub-cluster are currently included in the logical cluster, and whether that sub-cluster satisfies all of the application's dependencies) to a coordinator resource, a quorum or majority algorithm can then be applied to the set of values to determine which sub-cluster has won ownership.

In some embodiments, the results of the competition for ownership of the sub-cluster are tracked on the coordinator resource. For example, in one embodiment, the winning sub-cluster writes information identifying that sub-cluster as the winner to the coordinator resource. In some embodiments, each node in a logical cluster uses a key to access the coordinator resource for that cluster. Information indicating the current membership of the logical cluster can be encoded in these keys, so that if the logical cluster's membership is updated (e.g., to remove one or more nodes in the losing sub-cluster), the keys can also be updated. This can prevent nodes in the losing sub-cluster from being able to bring the application online (e.g., if those nodes reboot and otherwise 'forget' that their sub-cluster did not win the competition for ownership of the application's logical cluster). Alternatively, each node in a logical cluster can register a key with the coordinator resource. If a network partition is detected, the sub-clusters compete for ownership of the logical cluster by having at least one node in each sub-cluster try to eject all of the keys used by nodes in other sub-clusters (for that logical cluster) from the coordinator resource. The node in the winning sub-cluster will be the node that successfully removes every other sub-cluster's keys. Because the keys for the other sub-clusters are removed, nodes in those clusters will no longer be able to access the coordinator resource, which can prevent nodes in those sub-clusters from being able to bring the application online.

Once one of the sub-clusters wins ownership of a particular logical cluster, the winning sub-cluster will be the only sub-cluster allowed to update resources within the service group for that logical cluster. Thus, if sub-cluster 200(2) gains ownership of logical cluster 14(3), node 10(3) will still be able to modify data in volume 18(3) when running for application 12(3). However, node 10(1) in losing sub-cluster 200(1) will not be allowed to modify data in volume 18(3) any longer. Additionally, neither of nodes 10(1) and 10(2) will be able to bring application 12(3) online subsequent to sub-cluster 200(2) gaining ownership of logical cluster 14(3). Accordingly, once one of the sub-clusters wins ownership of a logical cluster, a node is not allowed to join that logical cluster unless the node is included in the winning sub-cluster.

If communication between sub-clusters, which were originally part of the same cluster, is reestablished, the resulting cluster becomes the owner of each logical cluster that was included in each of the component sub-clusters. Thus, if the failure that caused the original cluster to be partitioned is corrected and communication between the sub-clusters is reestablished, a node in the reformed cluster can be allowed to rejoin a logical cluster, even if that node had been forced to leave that logical cluster due to the original cluster partition.

In some embodiments, each node in a given logical cluster can track which nodes were part of the logical cluster before and after a cluster partition. For example, each node can maintain configured logical cluster membership information, which identifies which of the nodes were originally included in the logical cluster by an administrator, and current logical cluster membership information, which identifies which of the nodes are included in the logical cluster subsequent to one or more cluster partitions. If the original cluster is repaired (e.g., if at least some of the sub-clusters are again able to communicate with each other), nodes in the logical cluster can use this information to automatically rejoin nodes that were originally part of the logical cluster but were forced to leave the cluster due to the cluster partition. For example, if two nodes were forced to leave the logical cluster because of a cluster partition (e.g., if those two nodes were part of a sub-cluster that lost the competition for ownership of the logical cluster), those two nodes can automatically rejoin the logical cluster if the condition that caused the cluster partition is repaired. The nodes can track changes to logical cluster membership over multiple partitions (e.g., if a cluster is partitioned into several sub-clusters, and if the sub-cluster that wins ownership of the logical cluster is then itself partitioned into multiple sub-clusters, and so on). In some embodiments, nodes that were forced to leave the logical cluster due to a cluster partition automatically rejoin the logical cluster when the cluster partition is repaired. The nodes can rejoin the logical cluster without having to restart any applications running on nodes already in the logical cluster or applications running on the nodes that are joining the logical cluster. Additionally, the nodes can automatically rejoin the logical cluster without any administrator intervention.

Figure 3:
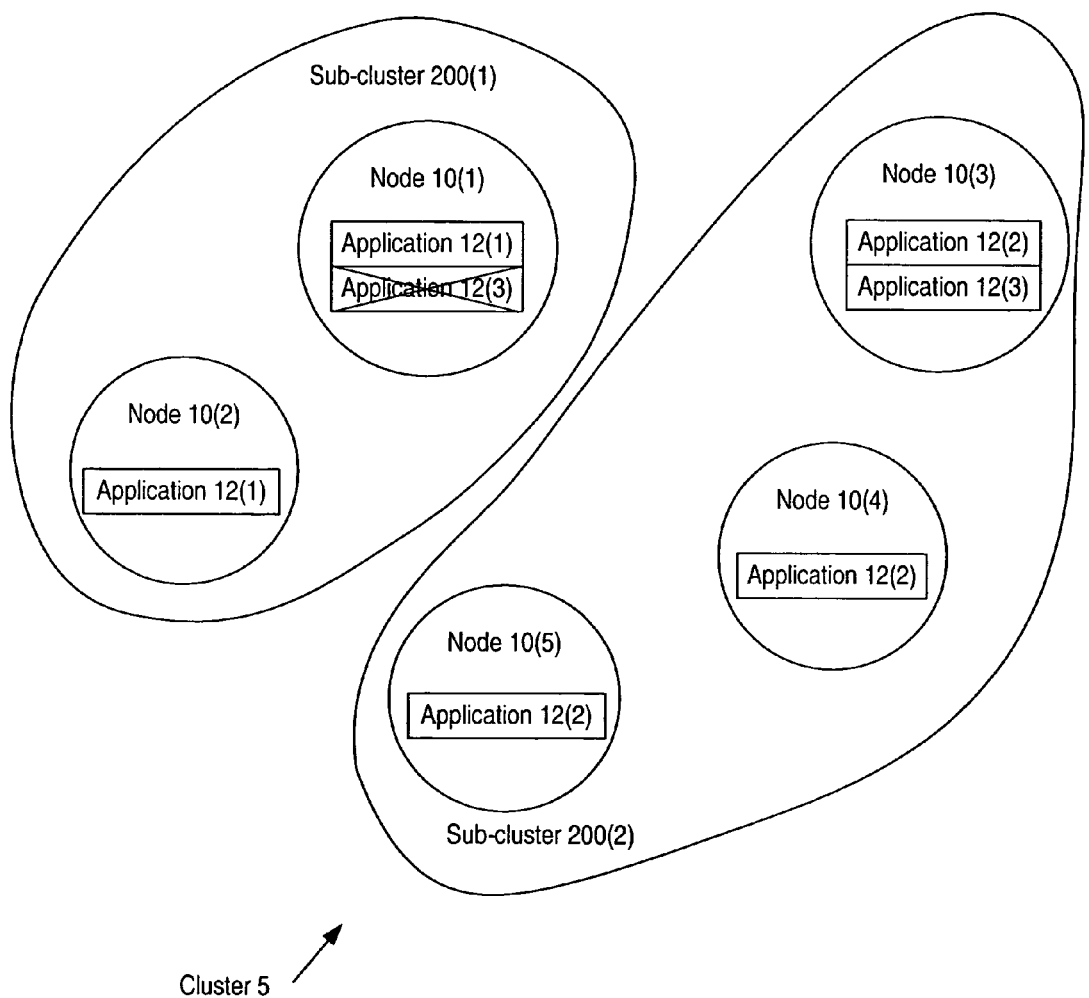
FIG. 3 shows how each sub-cluster continues to execute certain applications and how a sub-cluster can be selected as the owner of a particular logical cluster that spans more than one sub-cluster, according to one embodiment of the present invention.

FIG. 3 shows an example of how each sub-cluster 200 in FIG. 2 can continue to run certain applications subsequent to the cluster partition. Sub-cluster 200(1) continues to run application 12(1). Similarly, sub-cluster 200(2) continues to run application 12(2). In this example, sub-cluster 200(2) has won the competition for ownership of logical cluster 14(3), and thus node 10(3) runs application 12(3). Since sub-cluster 200(1) lost the competition for ownership of logical cluster 14(3), node 10(1) can no longer run application 12(3) (as indicated by the 'X' through the instance of application 12(3) in node 10(1). Additionally, nodes in sub-cluster 200(1) can no longer initiate changes to resources corresponding to applications 12(2) and 12(3), and nodes in sub-cluster 200(2) can no longer initiate changes to resources for application 12(1).

Figure 4:
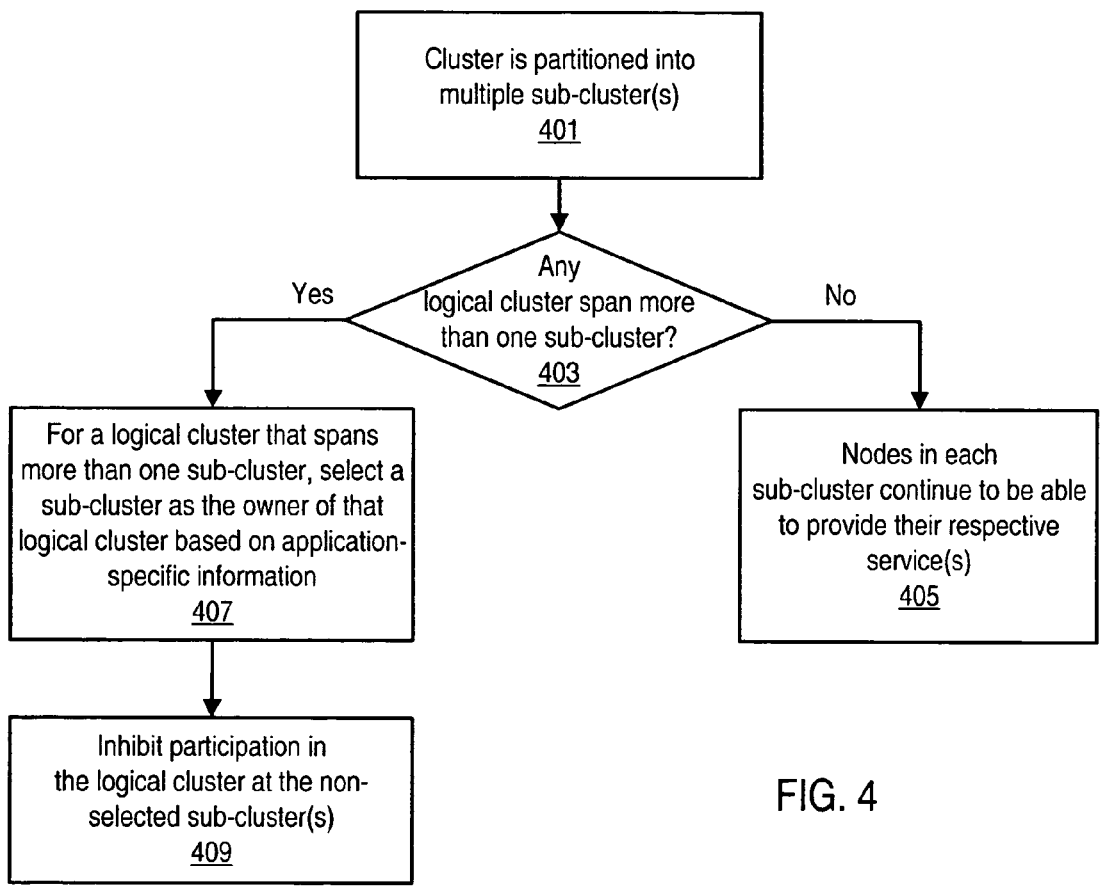
FIG. 4 is a flowchart of a method of responding to a cluster partition, according to one embodiment of the present invention.

FIG. 4 is a flowchart of a method of responding to a cluster partition, according to one embodiment of the present invention. A cluster, on which several applications are running, is partitioned into several sub-clusters, as indicated at 401. Before the cluster partition, each node in the cluster is configured to run at least one of the applications. Nodes that are configured to run the same application are included in the same logical cluster. If no logical cluster spans more than one of the sub-clusters, the nodes in each sub-cluster continues to provide their respective services, as indicated at 403-405. It is noted that the original cluster may itself be a sub-cluster of another cluster that was partitioned.

If a logical cluster spans more than one of the sub-clusters, one of the sub-cluster is selected as the owner of that logical cluster, as shown at 407. This selection process can depend on application-specific information for the application executing on that logical cluster (e.g., cluster configuration information that is specific to that application). For example, the selected sub-cluster can be the only sub-cluster that satisfies the application's dependencies. Alternatively, if the application's dependencies are satisfied on several sub-clusters, the selected sub-cluster can be the sub-cluster that includes the most nodes configured to run that application. If each sub-cluster includes the same number of nodes configured to run that application, and if each sub-cluster satisfies the application's dependencies, the selected sub-cluster can be the sub-cluster on which the application is currently online.

Once a sub-cluster is selected as the owner of the logical cluster, the non-selected sub-clusters are inhibited from participating in the logical cluster, as indicated at 409. For example, the application's service group can be brought offline in a non-selected sub-cluster and the cluster configuration information for each non-selected sub-cluster can be updated to indicate that no node in that sub-cluster can run the application.

Figure 5:
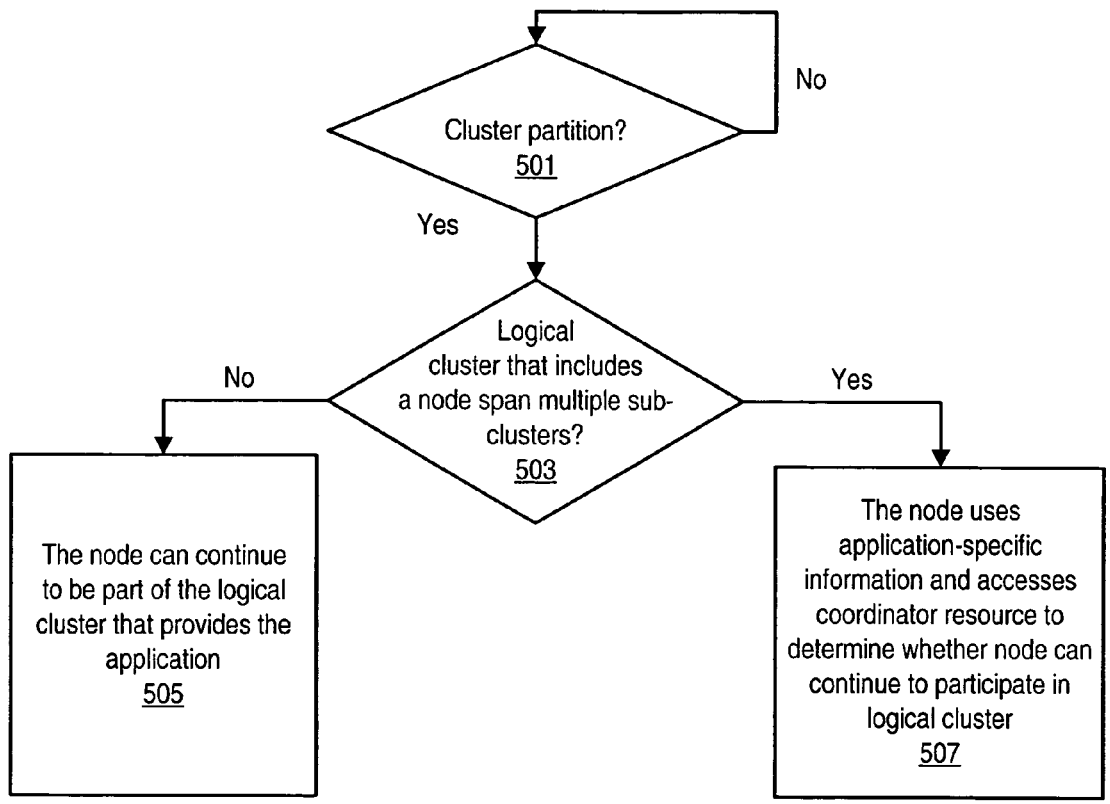
FIG. 5 is a flowchart of another method of responding to a cluster partition, according to one embodiment of the present invention.

FIG. 5 is a flowchart of another method of responding to a cluster partition. At 501, a cluster partition occurs, dividing a cluster into two or more sub-clusters. A node included in one of the sub-clusters is configured as part of a logical cluster for a particular application. As a result of the cluster partition, the node can no longer communicate normally with nodes in other sub-clusters. The node may detect the cluster partition when one or more nodes in the original cluster cease communicating with the node via normal communication channels. For example, as a result of the cluster partition, the node may suddenly stop receiving heartbeat messages from one or more other nodes.

If no other sub-cluster (other than the sub-cluster that includes the node) includes a node that is configured to run the application (i.e., if the logical cluster for the application spans multiple sub-clusters), as determined at 503, the node can continue to be part of the logical cluster for that application, as indicated at 505. In this situation, when the node detects the apparent failure of one or more other nodes due to the cluster partition, the node can access cluster configuration information to determine whether any of the apparently failed nodes are part of the same logical cluster as the node. If not, the node can continue to operate normally.

If instead the node detects that one or more of the apparently failed nodes are also part of the same logical cluster as the node, the node can access a coordinator resource in order to determine whether these other nodes are truly failed or if a cluster partition has occurred. If a cluster partition has occurred and the logical cluster now spans multiple sub-clusters, the node (or another node included in the same sub-cluster as the node) accesses a coordinator resource and uses the application-specific information for the application executing on the logical cluster in order to determine which sub-cluster will win ownership of the logical cluster, as shown at 507. For example, if the application-specific information indicates that the application is currently online on the node and that there is no other reason (e.g., such as a dependency on another application) to migrate the application to another sub-cluster, the node can write information to the coordinator resource indicating that the node's sub-cluster should win ownership of the logical cluster. If instead the application is currently offline on all nodes within the node's sub-cluster, the node can read from the coordinator resource to see if the sub-cluster on which the application is currently online will win ownership of the logical cluster.

If the node's sub-cluster wins ownership of the logical cluster, the node can continue to be part of the logical cluster that runs the application. If instead another sub-cluster wins ownership of the logical cluster, the node will no longer be able to participate in the logical cluster. In that situation, the node may update the cluster configuration information at each node in its sub-cluster to indicate that the node is no longer part of the logical cluster for that application.

Figure 6:
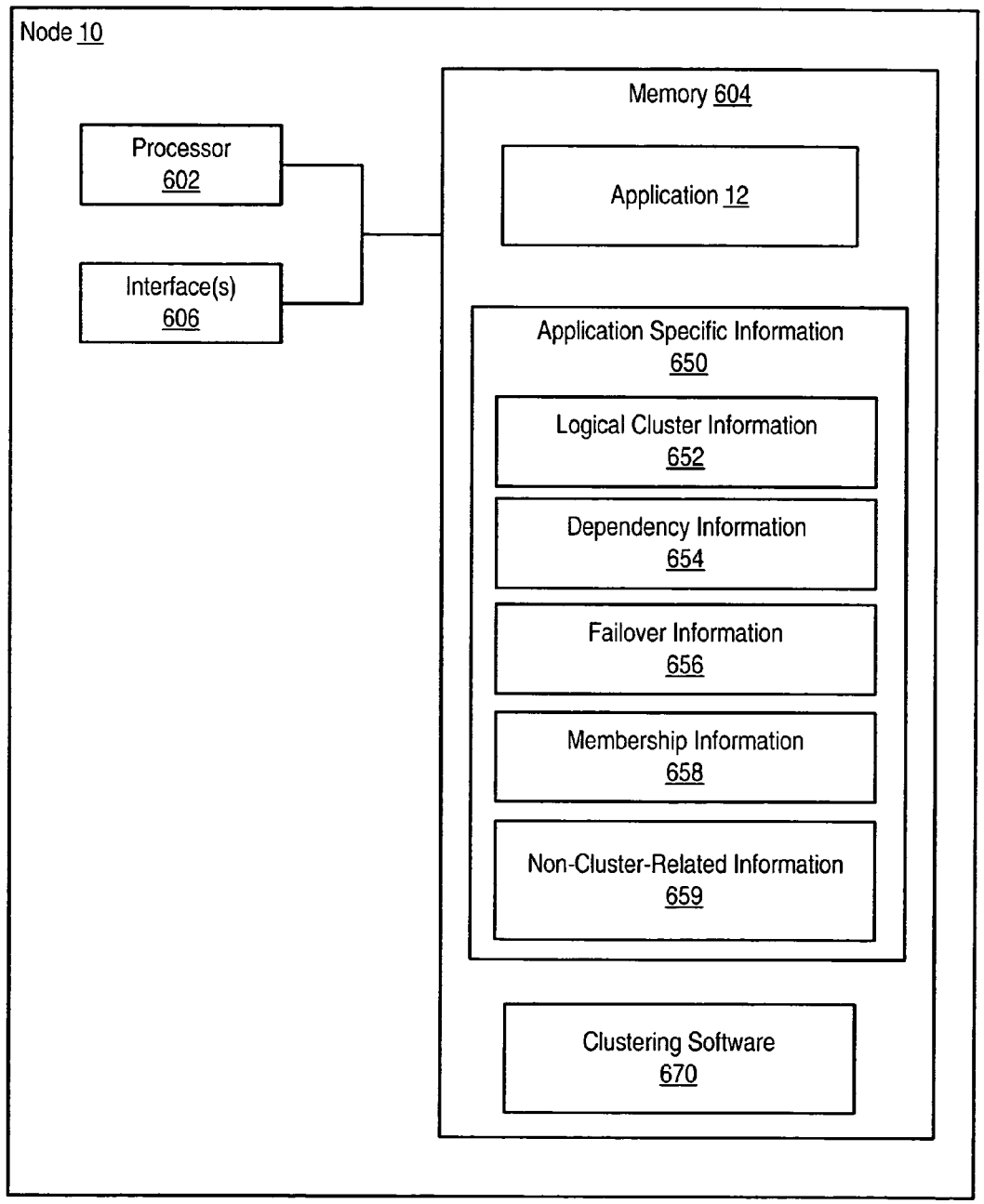
FIG. 6 is a block diagram of a node that can be included in a cluster, according to one embodiment of the present invention.

FIG. 6 is a block diagram of node 10 that can be included in a cluster. Node 10 includes at least one processor 602, a memory 604, and one or more interfaces 606. Processor 602 can be a microprocessor, PLD (Programmable Logic Device), ASIC (Application Specific Integrated Circuit), or other device configured to execute program instructions stored in memory 604. Memory 604 can include various types of RAM (Random Access Memory), ROM (Read Only Memory), Flash memory, MEMS (Micro Electro-Mechanical Systems) memory, and the like. Processor(s) 602, memory 604, and interface(s) 606 are coupled to send and receive data and control signals by one or more buses or other interconnects.

Interface(s) 606 can include network interfaces to various networks and/or interfaces to various peripheral buses. Interface(s) 606 can include an interface to one or more storage devices on which a storage volume (e.g., one or more of storage volumes 18, as shown in FIG. 1B) is implemented. Interface(s) 606 can also include an interface to a network, for use in communicating with other nodes and/or for use in communicating with networked storage devices. For example, interface(s) 606 can be used to communicate heartbeat messages with other nodes and/or to access a coordinator resource such as a storage volume via a SAN.

Memory 604 stores the data and program instructions, executable by processor 602, to implement one or more applications 12. Memory 604 also stores a copy of application-specific information 650. Application-specific information 650 can include various different types of cluster configuration information, such as logical cluster information 652 (e.g., identifying each different logical cluster implemented in the cluster), dependency information 654 (e.g., identifying whether a particular application depends on another application being online or offline in the same node and/or cluster); failover information (e.g., identifying the node in each failover group on which the application provided by that failover group is online and/or identifying each node in each failover group), and cluster membership information 658 (e.g., identifying each node in the cluster). Other types of information (e.g., identifying which resources a node needs in order to run a particular application, identifying the priority of failover groups within a cluster, and the like) can also be included in application-specific information 650. Additionally, application-specific information 650 can include non-cluster-related information 659. For example, application-specific information 650 can include non-cluster-related information 659 that specifies history and/or statistics about the performance of the application on node 10 and/or about the performance of the application on each node within the logical cluster on which that application is executing.

Data and program instructions executable to implement clustering software 670 are also stored in memory 604. Clustering software 670 coordinates the activities of node 10 with other nodes in the cluster. Clustering software 670 controls application 12 (e.g., clustering software 670 can bring application 12 online on node 10 in response to detecting the failure of another node in the failover group that runs application 12). Clustering software 670 can also monitor the resources used by application 12 (e.g., by testing those resources to see if they are online or offline) in order to determine whether node 10 currently has the ability to run application 12. When clustering software 670 detects the failure of an application or resource on node 10, clustering software 670 can restart that application on node 10 (e.g., if the failure was temporary) or relocate the application and its associated resources to another node in the cluster.

Clustering software 670 can send and receive messages via interface(s) 606 in order to monitor other nodes in the cluster and/or to communicate updates to cluster configuration information 650 with other nodes. Based on these messages, clustering software 670 can detect the failure of an application or node.

If a cluster partition occurs, clustering software 670 can determine whether the sub-cluster that includes node 10 has won ownership of the logical cluster for application 12 (e.g., clustering software 670 can perform the functions shown in FIG. 5 to make this determination). Based on this determination, clustering software 670 can then determine whether node 10 should bring application 12 online or offline in response to the cluster partition. If multiple clustered applications are configured to run on node 10, clustering software 670 can perform these determinations for each of the different clustered applications. If the sub-cluster that includes node 10 loses the compete (e.g., by 'racing') for ownership of the logical cluster for application 12, clustering software 670 can update cluster configuration information 650 to indicate that node 10 is no longer part of that logical cluster. Clustering software 670 can also communicate this update to other nodes in the same sub-cluster as node 10.

The program instructions and data implementing application 12 and/or clustering software 670, as well as application-specific information 650, can be stored on various computer readable storage media such as memory 604. In some embodiments, such software is stored on a computer readable storage medium such as a CD (Compact Disc), DVD (Digital Versatile Disc), hard disk, optical disk, tape device, floppy disk, and the like). In order be executed by processor 602, the instructions and data implementing application 12 and clustering software 670 are loaded into memory 604 from the other computer readable storage medium. Such instructions and/or data can also be transferred to node 10 for storage in memory 604 via a network such as the Internet or upon a carrier medium.

Although the present invention has been described with respect to specific embodiments thereof, various changes and modifications may be suggested to one skilled in the art. It is intended that such changes and modifications fall within the scope of the appended claims.

What is claimed is:

1. A method comprising:
executing a first application on a cluster, the cluster comprising a plurality of nodes; and
subsequent to the cluster being partitioned into a plurality of sub-clusters, a first one of the sub-clusters executing the first application, wherein
a second one of the sub-clusters is capable of executing a second application,
the first application executes on a first logical cluster,
if each of the nodes participating in the first logical cluster is included in the first one of the sub-clusters subsequent to the cluster being partitioned, the first one of the sub-clusters automatically wins ownership of the first logical cluster; and
subsequent to the first one of the sub-clusters winning ownership of the first logical cluster, one of the nodes is not allowed to join the first logical cluster unless the one of the nodes is comprised in the first one of the sub-clusters.

2. The method of claim 1, further comprising:
executing a plurality of applications on the cluster, the plurality of applications comprising the first application and the second application; and
subsequent to the cluster being partitioned into the plurality of sub-clusters, the second one of the sub-clusters executing the second application.

3. The method of claim 2, further comprising:
the first one of the sub-clusters winning ownership of a logical cluster on which the first application is executed, wherein
prior to the first one of the sub-clusters winning ownership of the logical cluster, more than one of the sub-clusters each included a node that participated in the logical cluster.

4. The method of claim 3, further comprising:
at least one of the nodes comprised in the logical cluster storing configured logical cluster membership information, which identifies which of the nodes were originally included in the logical cluster by an administrator of the cluster, and storing current logical cluster membership information, which identifies which of the nodes are included in the logical cluster subsequent to the first one of the sub-clusters winning ownership of the logical cluster.

5. The method of claim 4, further comprising:
in response to communication being reestablished between the sub-clusters, one or more nodes automatically rejoining the logical cluster, wherein
the one or more nodes are identified in the configured logical cluster membership information but not identified in the current logical cluster membership information.

6. The method of claim 3, further comprising:
a sub-cluster of the more than one of the sub-clusters continuing to execute a third application of the applications subsequent to the first one of the sub-clusters winning ownership of the logical cluster on which the first application is executed.

7. The method of claim 3, further comprising:
selecting the first one of the sub-clusters to win ownership of the logical cluster based on application-specific information associated with the first application.

8. The method of claim 7, wherein
the application-specific information comprises information identifying each node configured to participate in the logical cluster on which the first application is executed.

9. The method of claim 7, wherein
the application-specific information comprises information indicating that the first application is dependent on a third application of the applications; and
the first one of the sub-clusters comprises a node that is configured to execute the third application.

10. A method comprising:
detecting that a cluster has been partitioned into a plurality of sub-clusters, wherein the cluster executes one or more applications, and wherein one of the plurality of sub-clusters comprises a node; and
determining whether the node can execute a first one of the applications based on application-specific information associated with the first one of the applications, wherein the application-specific information identifies which nodes are part of a logical cluster on which the first one of the application is executing, and wherein the determining comprises determining that the node can execute the first one of the applications if, subsequent to the cluster being partitioned, each of the nodes participating in the logical cluster is included in the one of the sub-clusters.

11. The method of claim 10, wherein the determining whether the node can execute the first one of the applications comprises:
accessing a coordinator resource if a second node in another one of the sub-clusters is part of a logical cluster on which the first one of the applications is executing.

12. The method of claim 10, wherein
the application-specific information identifies whether the first application is dependent on a second application,
the application-specific information indicates whether the node is configured to execute the second application.

13. The method of claim 10, further comprising:
determining whether the node can execute a second application of the applications independently of determining whether the node can execute the first application.

14. A computer system comprising:
a processor; and
memory coupled to the processor, wherein the memory stores program instructions executable by the processor to:
detect that a cluster has been partitioned into a plurality of sub-clusters, wherein the cluster executes one or more applications, and wherein one of the plurality of sub-clusters comprises a node; and
determine whether the node can execute a first one of the applications based on application-specific information associated with the first one of the applications, wherein the application-specific information identifies which nodes are part of a logical cluster on which the first one of the application is executing, and wherein the determining comprises determining that the node can execute the first one of the applications if, subsequent to the cluster being partitioned, each of the nodes participating in the logical cluster is included in the one of the sub-clusters.

15. The node of claim 14, wherein the program instructions are executable to:
access a coordinator resource if a second node in another one of the sub-clusters is part of the logical cluster.

16. The node of claim 14, wherein
the application-specific information identifies whether the first application is dependent on a second application,
the application-specific information indicates whether the node is configured to execute the second application.

17. The node of claim 14, wherein
the cluster manager is configured to determine whether the node can execute a second application of the applications independently of determining whether the node can execute the first application.

18. A computer readable storage medium comprising program instructions executable to:
detect that a cluster has been partitioned into a plurality of sub-clusters, wherein the cluster executes one or more applications, and wherein one of the plurality of sub-clusters comprises a node; and
determine whether the node can execute a first one of the applications based on application-specific information associated with the first one of the applications, wherein the application-specific information identifies which nodes are part of a logical cluster on which the first one of the application is executing, and wherein the determining comprises determining that the node can execute the first one of the applications if, subsequent to the cluster being partitioned, each of the nodes participating in the logical cluster is included in the one of the sub-clusters.

19. The computer readable storage medium of claim 18, wherein
the application-specific information identifies which nodes in the cluster are part of a logical cluster on which the first application is executing.

20. The computer readable storage medium of claim 18, wherein the program instructions are executable to:
access a coordinator resource if a second node in another one of the sub-clusters is part of the logical cluster.

21. The computer readable storage medium of claim 18, wherein the program instructions are executable to:
determine whether the node can execute a second application of the applications independently of determining whether the node can execute the first application.

22. A system comprising:
means for detecting that said cluster has been partitioned into a plurality of sub-clusters, wherein the cluster executes one or more applications, and wherein one of the sub-clusters comprises a node;
means for determining whether the node can execute a first one of the applications based on the application-specific information associated with the first one of the applications, wherein the application-specific information identifies which nodes are part of a logical cluster on which the first one of the application is executing, and wherein the determining comprises determining that the node can execute the first one of the applications if, subsequent to the cluster being partitioned, each of the nodes participating in the logical cluster is included in the one of the sub-clusters; and
a computer readable storage medium for storing the application-specific configuration information.

* * * * *